March 31, 1936. S. LARSON 2,035,486
COUPLER FOR AUTOMOBILES, TRACTORS, OR SIMILAR VEHICLES
Filed Sept. 21, 1934 2 Sheets-Sheet 1
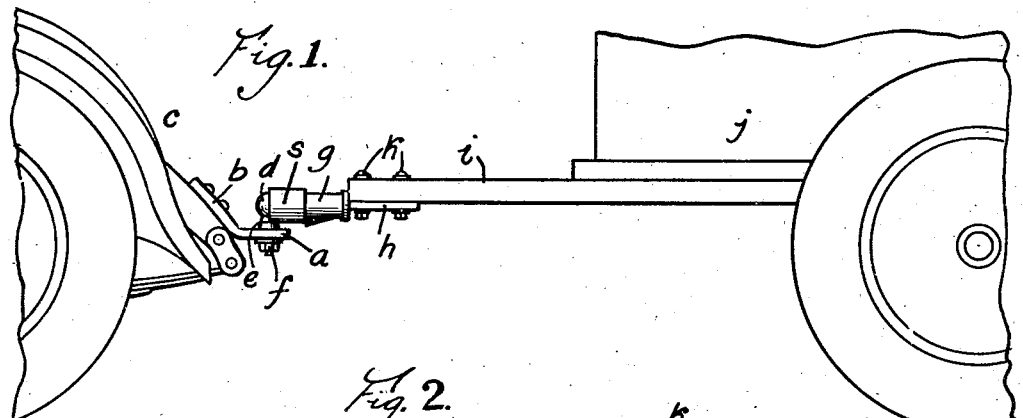
Fig. 1.
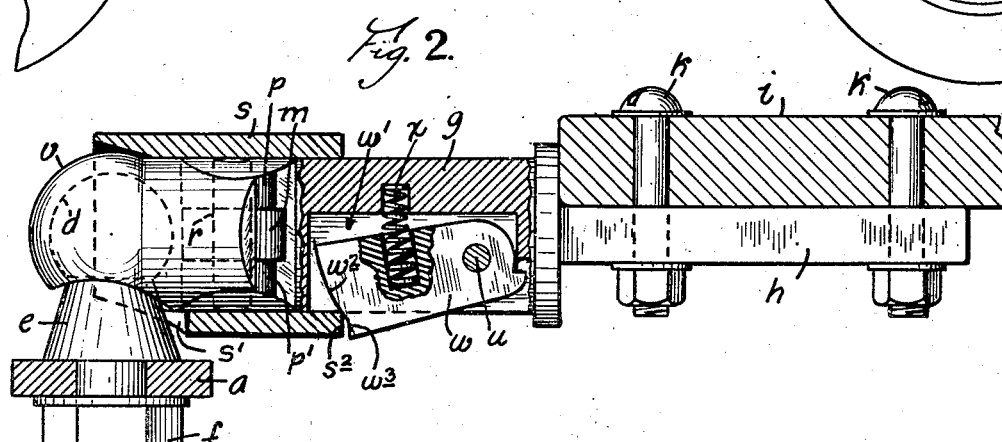
Fig. 2.
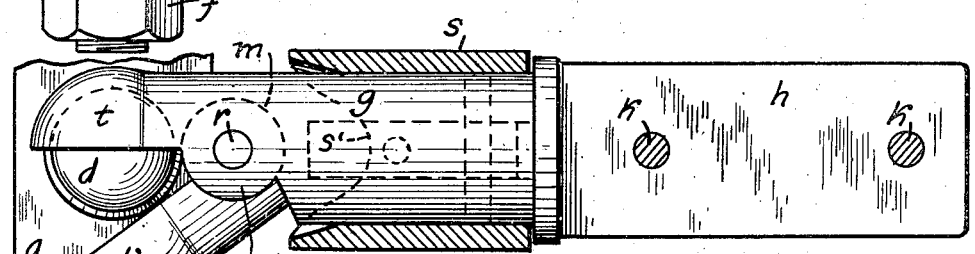
Fig. 3.
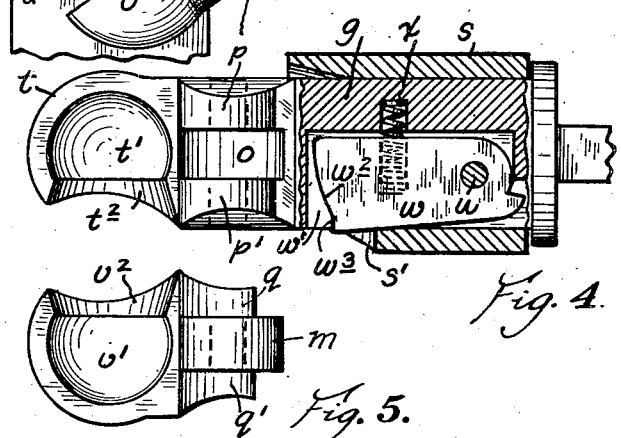
Fig. 4.
Fig. 5.
Inventor:
Sigfrid Larson
by
Atty March 31, 1936.          S. LARSON          2,035,486
COUPLER FOR AUTOMOBILES, TRACTORS, OR SIMILAR VEHICLES
Filed Sept. 21, 1934          2 Sheets—Sheet 2
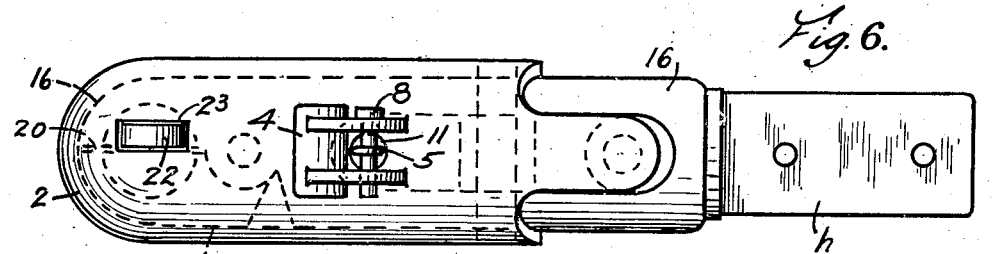
Fig. 6.
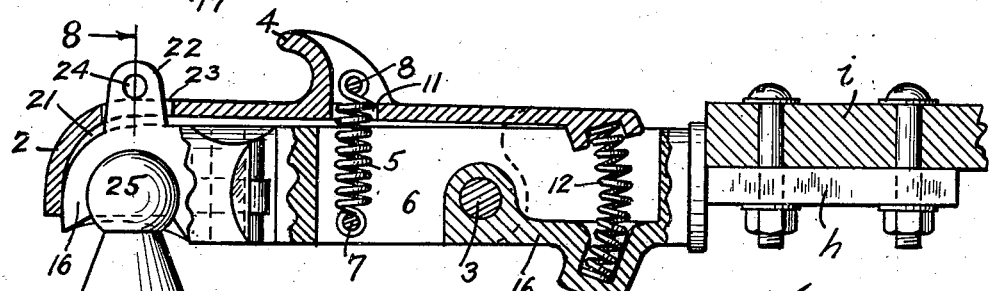
Fig. 7.
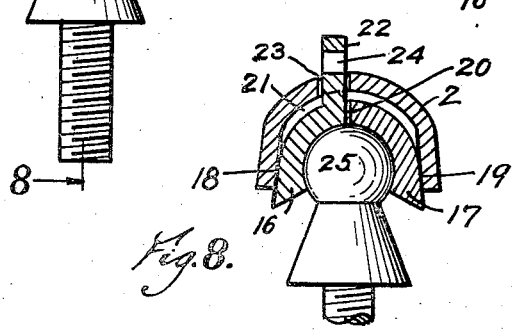
Fig. 8.
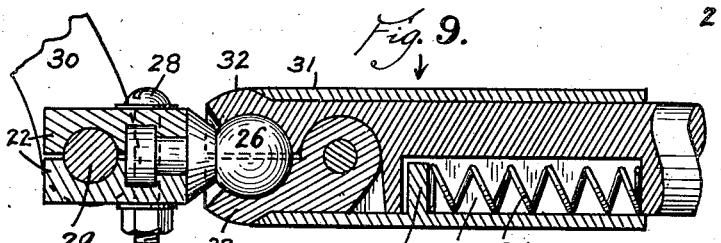
Fig. 9.
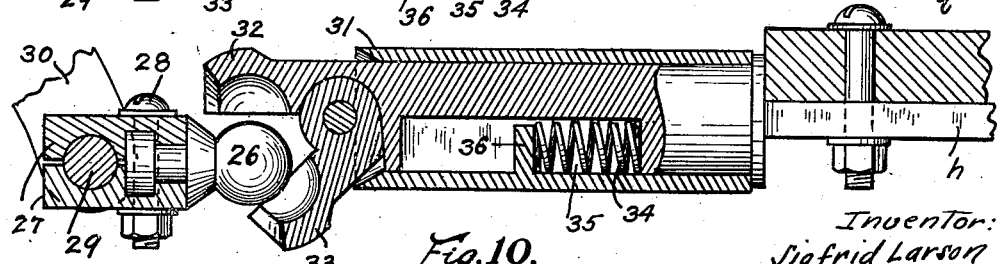
Fig. 11.
Fig. 10.
Inventor:
Sigfrid Larson
by ____ Atty.

Patented Mar. 31, 1936

2,035,486

UNITED STATES PATENT OFFICE 2,035,486

COUPLER FOR AUTOMOBILES, TRACTORS, OR SIMILAR VEHICLES

Sigfrid Larson, Portland, Oreg.

Application September 21, 1934, Serial No. 744,953

6 Claims. (Cl. 280—33.15)

My invention relates particularly to means for coupling a trailer to an automobile passenger car or truck, or for coupling vehicles or implements to tractors. With such devices it is necessary that the coupling means used be strong enough to stand required heavy pull and strain, but so constructed as to prevent play or slack between the coupling elements which would cause jerks between the connected vehicles. On the other hand it is necessary to allow for a certain amount of turning of one vehicle independently of the other, as when rounding curves in the road, the coupling must further allow for relative rotation of the coupling parts, as when the vehicles pass over rough roads.

One of the principal objects of my invention is to provide an improvement in the coupler of the ball-and-socket type, the purpose of which improvement is to construct the socket element of the coupling of a rigid, jaw-like part, and movable, jaw-like part, and to provide the movable, jaw-like portion with a central, integral hinge knuckle which bears in a cavity therefor provided in the rigid jaw-like portion; and with means for locking said jaws together. By this construction, the pulling strain imposed upon the coupling will be borne by said knuckle and the wall of its said cavity, independently of the hinge pin connecting the jaws; so that even if the hinge pin were to be sheared off, or dropped out, the coupling could not become disengaged so long as the jaws of the socket were held locked together.

A further object of my invention is so to construct my coupler that it may be easily connected and disconnected, and that the parts be strongly, simply and inexpensively made.

The foregoing objects and other features of my invention I attain by the device hereinafter described with respect to the attached drawings, in which:

Fig. 1 is a side view of my coupler device showing the same as used for coupling an automobile trailer to the rear of an auto passenger car;

Fig. 2 is a vertical section, drawn to a larger scale, of the coupling device shown in Fig. 1, with some of the parts shown in full;

Fig. 3 is a top elevation drawn to the same scale as Fig. 2, with a portion of the coupling device shown in section, and with the ball-socket element opened for uncoupling;

Fig. 4 is a fragmentary vertical section similar to Fig. 2 but with the movable section of the ball-socket element removed, to show the interior of said ball-socket;

Fig. 5 is an interior view of the movable section of the ball-socket removed in Fig. 4;

Figs. 6 and 7 show a top view and a sectional side elevation, respectively, of a modified form of my coupler;

Fig. 8 is a vertical section on lines 8—8 of Fig. 7;

Fig. 9 is a vertical section of still another modified form in which my coupler may be made;

Fig. 10 is a vertical section similar to Fig. 9, but with the coupling element opened and uncoupled; and Fig. 11 is top elevation of part of the coupling element shown in section in Figs. 9 and 10.

A bracket $a$ adapted to be attached to the rear of an automobile $c$ as at $b$, has mounted thereon a ball $d$ provided with a conical base $e$ and secured in place on the bracket $a$ by a nut $f$. A socket $g$, made to fit over and around the ball $d$, has a flattened horizontal shank projection $h$ which is attached to the end of the draft bar $i$ of the trailer $j$ by bolts $k$.

The socket $g$ is composed of two jaw-like parts, namely, the rigid half-socket or jaw $t$, integral with the shank $h$, and the movable jaw $v$ hinged to said rigid jaw $t$. Referring to Figs. 1 to 5, the movable jaw $v$ is made with an integral central hinge knuckle $m$, the periphery of which extends completely around, and concentrically with the hinge axis of the movable jaw $v$, and this jaw is further provided with a cavity $q$, $q'$ on each side of said knuckle $m$. The rigid jaw $t$ is provided with a central annular socket-like cavity $o$ concentric with said hinge axis, in which cavity said knuckle $m$ of the movable jaw rotatably bears. The rigid jaw $t$ further has a hinge knuckle $p$, $p'$ on each side of its said central cavity $o$, and said knuckles $p$, $p'$ bear in the said cavities $q$, $q'$ of the movable jaw. A pin $r$ passes thru the said hinge knuckles $p$ and $p'$ and the knuckle $m$. The inside of the movable jaw $v$ is cut away to form a semi-spherical cavity $v'$, corresponding to the semi-spherical cavity $t'$ in the half-socket or rigid jaw $t$, to accommodate the ball $d$; and the lower portions of the half-socket or rigid jaw $t$ and of the movable jaw $v$ are cut away at $t2$ and $v2$ to permit freedom of movement about the conical base $e$ of the ball $d$. A sleeve $s$ slides over the said jaw portions $t$ and $v$ and is adapted to hold the movable jaw $v$ closed when the sleeve is in the position shown in Fig. 2, and to permit the movable jaw to be opened when the sleeve is slid back into the position shown in Fig. 3. The bottom of the sleeve $s$ is cut away at $s'$ to prevent interference with the base $e$ of the ball $d$. As apparent, the hinge knuckles p, p' of the rigid jaw t aid in holding the hinge knuckle m of the movable jaw v against lateral displacement from its socket-like cavity o.

A latch w fastened in a central vertical cavity w' of the socket g by means of the pin u and bearing against a spiral spring x is adapted to hold the sleeve s in the position shown in Fig. 2. The end w2 of the latch w is curved as shown in Fig. 2 and is adapted to bear against the edge s2 of the sleeve s, the edge s2 being slightly beveled. Thus even if the end w2 of the latch s2 of the sleeve should wear the end of the latch will always bear against the edge of the sleeve. At the bottom of the outer end of the latch w is straight as at w3 to act as a safety catch and prevent the sleeve from pushing the latch up. When the latch w is pressed up, the sleeve s can easily be slid back to the position shown in Figs. 3 and 4, which will then permit the movable jaw v to be opened, the ball d to be removed from the socket, and the two vehicles to be uncoupled.

The integral central hinge knuckle m of the movable jaw v bearing in the said socket-like cavity of the rigid jaw t, of the socket element of my coupler, prevents any undue strain being imposed on the hinge pin r. In fact, the said integral knuckle m of the movable jaw v, by its engagement with the wall of the socket-like cavity o of the rigid jaw t, sustains the pull imposed on the coupling elements of my coupler independently of the hinge pin r; so that, even if the hinge pin r were to be sheared off or dropped out, the coupling could not become disengaged, so long as the jaws of the socket g are locked together by the sleeve s. The hinge pin r in fact merely serves as a convenient connection of the movable jaw v to the rigid jaw t.

Thus this ball and socket joint of my coupler permits the necessary freedom of movement between the two coupled vehicles, but prevents any undesired play between them, as in an ordinary link connection or similar form of coupling. The simplicity and strength of my coupling are also apparent.

In a modification of my invention, I provide, in place of the sleeve s, of Figs. 1, 2, 3 and 4, a latch in the form of a cap or keeper fitting over the socket 16 as shown by 2 in Figs. 6, 7 and 8. This latch 2 is pivoted on the socket 16 by the pin 3, and adapted to be raised by the handle 4. In this modification of my coupler the socket section 16 is made with a central cavity 6. A compression spring 5 attached to pins 7 and 8 is arranged in said cavity 6 to hold the latch 2 normally in closed position. The spring 5 extends thru an opening 11 in the top of the latch 2. A supplemental expansion spring, as 12, may also be provided to insure the keeping of the latch 2 constantly in closed position should spring 5 become broken.

In order to take up the wear between the outside surface of the ball member 25 and the inside of the socket 16 and jaw 17, the jaw 17 is so made as to leave a space 20 between the top and end of the jaw and the socket when the jaw is in closed position (see Fig. 8). The side faces of jaw and socket flare slightly, as indicated at 18 and 19, instead of being rounded, and the inside surface of the latch 2 is made to engage these surfaces 18 and 19 leaving a space 21 between the top of the socket and jaw and the inside of the latch. Thus even tho the inside of the socket and jaw bearing on the ball member 25 should wear, the space 20 will take up the wear and the latch 2 will still fit snugly over the socket and prevent any play between ball member and socket member or between socket member and latch when the latter is in closed position.

As a means of locking the latch in closed position, I have made the socket 16 with a lug 22 and provided a slot 23 in the latch allowing the lug 22 to extend up thru the latch. A hole 24 thru the lug 22 permits the insertion of a padlock, and when locked in this manner the latch 2 cannot be raised, the socket cannot be opened, the ball member 25 cannot be removed from the ball and socket joint, and the two vehicles cannot be uncoupled.

A further slight modification of my device is shown in Figs. 9, 10 and 11 where my invention is adapted for use with the ball member 26 fastened horizontally (instead of vertically as in the preceding descriptions) by means of clamp 27 and bolts 28 to a bar 29 held between a pair of end frame members 30 of an automobile. In this modification of my invention, a sleeve 31 slides over the socket 32 and holds the movable jaw 33 closed. A compression spring 34 placed in the cavity 35 in the socket bears against a lug 36 of the sleeve 31 and serves to keep the sleeve in the position shown in Fig. 9. The uncoupling, as apparent, is a very simple matter and is illustrated by Fig. 10.

I claim:
1. In a vehicle coupler including a ball and socket joint, a socket element comprising a rigid member and a hinged movable member, the movable member provided with a circular lug, and the rigid member provided with spaced ears and an intermediate circular cavity in which said lug rotatably bears, and a hinge pin extending thru said ears and said lug, whereby the outer wall portion of said cavity provides a shoulder against which said lug bears, thus imposing the pulling strain on said lug and said shoulder and correspondingly relieving the hinge pin of such pulling strain, a cap-like latch pivoted on and fitting over said socket element for locking the movable section thereof closed, the sides of said rigid member and said movable member flaring outward, with the top and end of said movable member spaced slightly from said rigid member when in closed position, and with the interior of said cap-like latch being adapted to bear on said sides, thus preventing play between ball element and said socket element or between socket element and said latch when the latter is in closed position.

2. In a vehicle coupler including a ball and socket joint, a socket element comprising a rigid member and a hinged movable member, the movable member provided with a circular lug, and the rigid member provided with spaced ears and an intermediate circular cavity in which said lug rotatably bears, and a hinge pin extending thru said ears and said lug, whereby the outer wall portion of said cavity provides a shoulder against which said lug bears, thus imposing the pulling strain on said lug and said shoulder and correspondingly relieving the hinge pin of such pulling strain, a cap-like latch pivoted on and fitting over said socket element for locking the movable section thereof closed, and spring means for holding said latch in closed position.

3. In a vehicle coupler including a ball and socket joint, a socket element comprising a rigid member and a hinged movable member, the movable member provided with a circular lug, and the rigid member provided with spaced ears and an intermediate circular cavity in which said lug rotatably bears, and a hinge pin extending thru said ears and said lug, whereby the outer wall portion of said cavity provides a shoulder against which said lug bears, thus imposing the pulling strain on said lug and said shoulder and correspondingly relieving the hinge pin of such pulling strain, a cap-like latch pivoted on and fitting over said socket element for locking the movable section thereof closed, and means for holding said latch in closed position and locking means for locking said latch when closed.

4. In a ball-and-socket vehicle coupler, a socket comprising two jaw-like portions, one thereof rigid with one member of the coupler and the other hinged to the rigid jaw; the hinged jaw provided with an integral, central hinge-knuckle the periphery of which extends completely around and is concentric with the hinge axis, and this jaw further provided with a socket-like cavity on each side of said central knuckle; the rigid jaw provided with a central annular cavity, concentric with said hinge axis, in which cavity said knuckle of the movable jaw rotatably bears, the rigid jaw having further a hinge-knuckle, on each side of its said cavity, which knuckles bear in said side cavities of the hinged jaw; a hinge pin extending thru said hinge knuckles; and means for locking said jaws together; whereby to impose the pulling strain of said hinge jaw upon said knuckle of said hinged jaw and the wall of said socket-like cavity of the rigid jaw in which said knuckle bears, independently of the hinge pin.

5. The combination described by claim 4 with the jaw locking means comprising a sleeve slidable over said jaws and a spring controlled gravity actuated latch normally holding said sleeve against retraction.

6. The combination described by claim 4 with said jaw locking means comprising a cap-like spring controlled latch normally encompassing said jaws and locking them together.

SIGFRID LARSON.